United States Patent [19]
Hallin et al.

[11] Patent Number: 5,966,951
[45] Date of Patent: Oct. 19, 1999

[54] ABSORPTION REFRIGERATOR WITH AUTOMATIC DEFROSTING

[75] Inventors: Ingemar Hallin, Lidingo; Per Levin, Motala; Mattias Nyqvist, Stockholm, all of Sweden

[73] Assignee: AB Electrolux, Stockholm, Sweden

[21] Appl. No.: 09/073,688

[22] Filed: May 6, 1998

[30] Foreign Application Priority Data

Jun. 24, 1997 [SE] Sweden ................................. 9702402

[51] Int. Cl.⁶ ............................ F25B 15/00; F25D 17/02
[52] U.S. Cl. ................................ 62/141; 62/186; 62/154; 62/408
[58] Field of Search ............................. 62/186, 187, 180, 62/139, 152, 154, 272, 148, 141, 476, 441, 408

[56] References Cited

U.S. PATENT DOCUMENTS

| | | | |
|---|---|---|---|
| 3,177,675 | 4/1965 | Kogel | 62/148 |
| 3,382,683 | 5/1968 | Wiljanen | 62/187 |
| 3,793,847 | 2/1974 | Scarlett et al. | 62/190 |
| 4,764,193 | 8/1988 | Clawson | 62/3.3 |
| 5,159,972 | 11/1992 | Gunnerson et al. | 165/32 |
| 5,255,530 | 10/1993 | Janke | 62/180 |
| 5,269,152 | 12/1993 | Park | 62/89 |
| 5,355,686 | 10/1994 | Weiss | 62/89 |
| 5,471,849 | 12/1995 | Bessler | 62/186 |

FOREIGN PATENT DOCUMENTS

| | | | |
|---|---|---|---|
| 343532 | 11/1989 | European Pat. Off. | |
| 310739 | 5/1929 | United Kingdom | 62/187 |
| 1020318 | 2/1966 | United Kingdom. | |

*Primary Examiner*—William Doerrler
*Attorney, Agent, or Firm*—Pearne, Gordon, McCoy & Granger LLP

[57] ABSTRACT

A refrigerator cabinet operated by an absorption refrigerating apparatus has a freezing compartment cooled by an upper part of an evaporator of the apparatus and a refrigerating compartment that is cooled by a lower part of the evaporator. The temperature in the refrigerating compartment is kept at a set value by activating or shutting off the refrigerating apparatus. The upper part of the evaporator is provided with a thermally conductive plate for cooling the freezing compartment. The temperature in the freezing compartment is kept at a set value by heat transfer to the plate. For example, a variable speed fan in the freezing compartment moves the air through a duct and past the plate. A film heater on the plate is used for defrosting and for controlling temperature in the freezing compartment.

26 Claims, 4 Drawing Sheets

ABSORPTION REFRIGERATOR WITH AUTOMATIC DEFROSTING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The invention relates generally to a refrigerator cabinet cooled by an absorption refrigerating apparatus and specifically to an automatic defrosting system for the refrigerator cabinet.

Refrigerator cabinets include a freezing compartment, refrigerated by an upper part of an evaporator, and a refrigerating compartment, refrigerated by a lower part of the evaporator. The operation of the refrigerating apparatus is controlled by a first means, which senses the temperature in the refrigerating compartment. The air in the freezing compartment is refrigerated by a fan circulating the air past the upper part of the evaporator. Such a refrigerator cabinet is described in U.S. Pat. No. 3,177,675. Its electrically driven fan is in operation when the refrigerating apparatus is in operation and is shut off when the evaporator is defrosted.

Such a cabinet has the drawback that, when the ambient temperature is low, say +10° C., the demand for cooling in the refrigerating compartment, which for instance is maintained at a temperature of +3° C., will decrease and the refrigerating apparatus will be shut off during periods that are longer than when the ambient temperature is higher. Thus, the flow of refrigerant through the evaporator will decrease causing the temperature in the freezing compartment to rise.

The object of the invention is to eliminate such a drawback and effectively control the temperature in the freezing compartment, not only for efficient cooling, but also for efficient automatic defrosting of the freezing compartment.

BRIEF SUMMARY OF THE INVENTION

The present invention provides a refrigerated cabinet including an absorption refrigeration apparatus having an evaporator. A freezing compartment is cooled by a first part of the evaporator and a refrigerating compartment is cooled by a second part of the evaporator. A temperature adjustment device is provided for adjusting the temperature in the freezing compartment separately from the refrigerating compartment. A first controller senses temperature in the refrigerating compartment. A second controller senses temperature in the freezing compartment and controls the temperature adjustment device responsive to the temperature sensed in the freezing compartment.

A heater is disposed in the freezing compartment and connected to be operated by the second controller. The second controller operates the heater responsive to the temperature sensed in the freezing compartment. The heater is disposed and operated for defrosting a heat transfer element of the freezing compartment.

According to one aspect of the invention, the temperature adjustment device is a fan and the second controller controls the fan responsive to the temperature sensed in the freezing compartment. The second controller controls the speed of the fan responsive to the temperature sensed in the freezing compartment. The fan speed is infinitely variable and the second controller continuously varies the fan speed responsive to the sensed temperature. A heat transfer plate is provided for conducting heat from the freezing compartment to the first part of the evaporator. A wall located in the freezer compartment and spaced from the transfer plate defines a duct for air flow, wherein the fan is disposed for blowing air through the duct.

According to another aspect of the invention, the temperature adjustment device is a damper that is movable to control air flow through the duct and the second controller controls the position of the damper. A motor is provided for moving the damper, wherein the damper is a slidable door.

According to a different aspect of the invention, the temperature adjustment device is a heat pipe having a valve for controlling flow of refrigerant in the heat pipe, wherein the heat pipe conducts heat from the freezing compartment to the first part of the evaporator and the second controller controls the position of the valve. The heat pipe contains refrigerant in liquid and vapor phases and includes a condenser tube located at the first part of the evaporator and an evaporator tube located in the freezing compartment.

According to another aspect of the invention, the temperature adjustment device is a Peltier element having a first face at the first part of the evaporator and a second face in communication with the freezing compartment, wherein the second controller is connected to control a voltage supplied to the Peltier element. A heat transfer plate is provided for conducting heat from the freezing compartment to the second face of the Peltier element.

According to a different aspect of the invention, the temperature adjustment device includes a movable wall disposed between the first part of the evaporator and the freezing compartment, wherein the second controller is connected to control movement of the wall. The movable wall is disposed in the freezing compartment adjacent the heat transfer plate and movement of the wall exposes the heat transfer plate to the freezing compartment. The movable wall is a suspended collapsible blind operated by a motor.

According to another aspect of the invention, a film heater is disposed on the transfer plate. The plate conducts heat from the freezing compartment to an upper part of the evaporator for cooling the freezing compartment. The second controller senses temperature in the freezing compartment and is connected to control power to the film heater. A sensor is disposed for sensing frost on the transfer plate wherein the second controller is connected to operate the heater responsive to the sensing of frost on the transfer plate. The frost sensor is a temperature sensor disposed on the transfer plate. The second controller is connected to operate the heater responsive to the temperature sensed in the freezing compartment. The second controller is connected to operate the heater for controlling the temperature in the freezing compartment and for defrosting the heat transfer plate.

The invention also provides a method of operating a refrigerated cabinet. The cabinet includes an absorption refrigeration apparatus having an evaporator; a freezing compartment cooled by a first part of the evaporator; a refrigerating compartment cooled by a second part of the evaporator; a temperature adjustment device; a first controller that senses temperature in the refrigerating compartment; and a second controller that senses temperature in the freezing compartment and controls the temperature adjustment device. The method includes the steps of transferring heat from the freezing compartment to the first part of the evaporator; transferring heat from the refrigerating compartment to the second part of the evaporator; sensing temperature in the refrigerating compartment; controlling operation of the refrigeration apparatus responsive to the temperature sensed in the refrigerating compartment; sensing temperature in the freezing compartment; and controlling operation of the temperature adjustment device responsive to the temperature sensed in the freezing compartment to adjust the heat transfer from the freezing compartment to the first part of the evaporator to thereby control the temperature in the freezing compartment separately from the temperature in the refrigerating compartment.

The objects of the invention are reached by constructing the refrigerator cabinet according to the invention by sensing the temperature in the freezing compartment and operating the temperature control device such that heat transfer to the upper part of the evaporator is increased when the temperature in the freezing compartment rises.

BRIEF DESCRIPTION OF THE SEVERAL VIEWS OF THE DRAWING

An embodiment of the invention is described below in connection with the drawings, in which.

DESCRIPTION OF THE INVENTION

Figure 1:
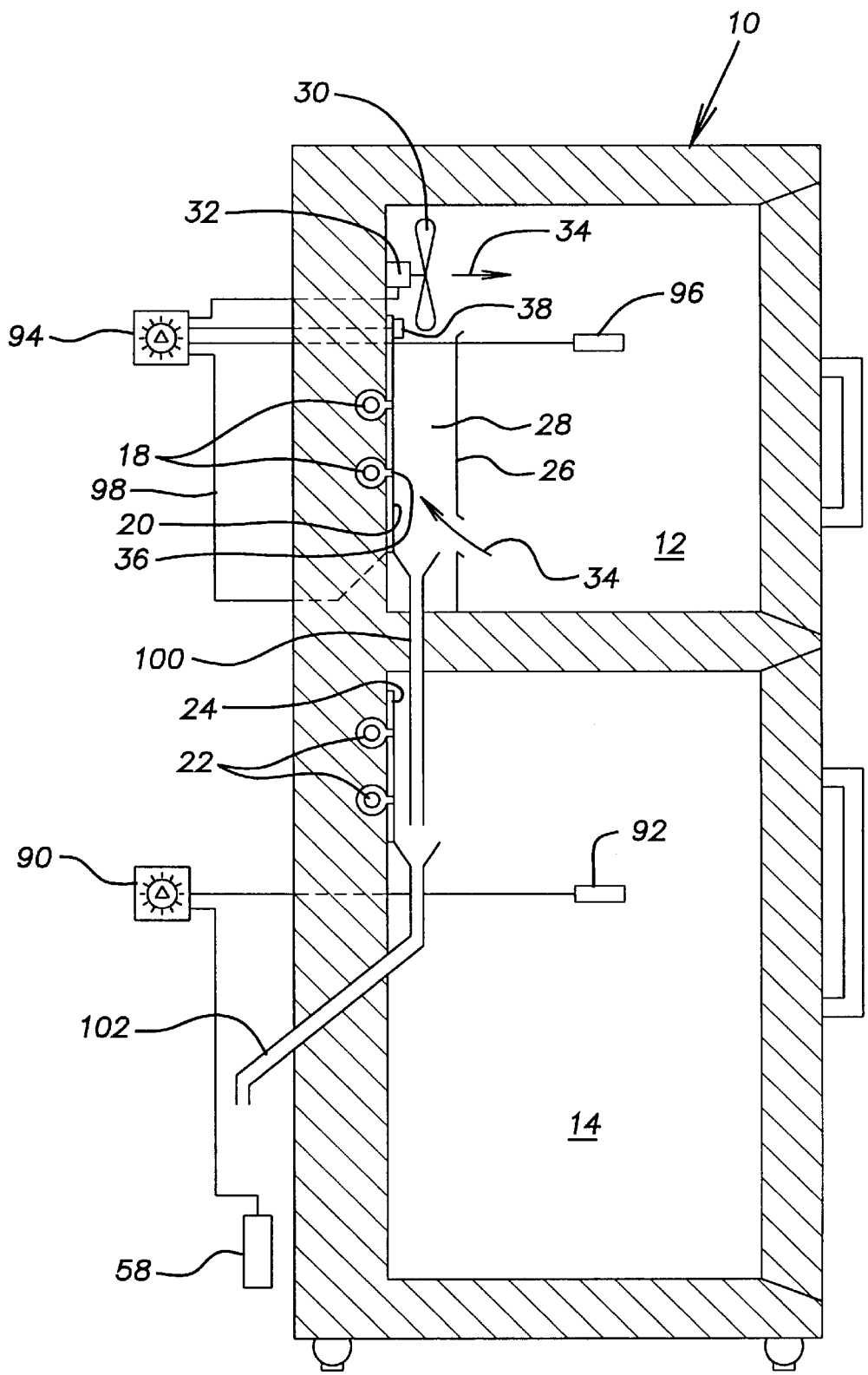
FIG. 1 shows a schematic sectional side view of a refrigerator cabinet according to the invention.
Figure 2:
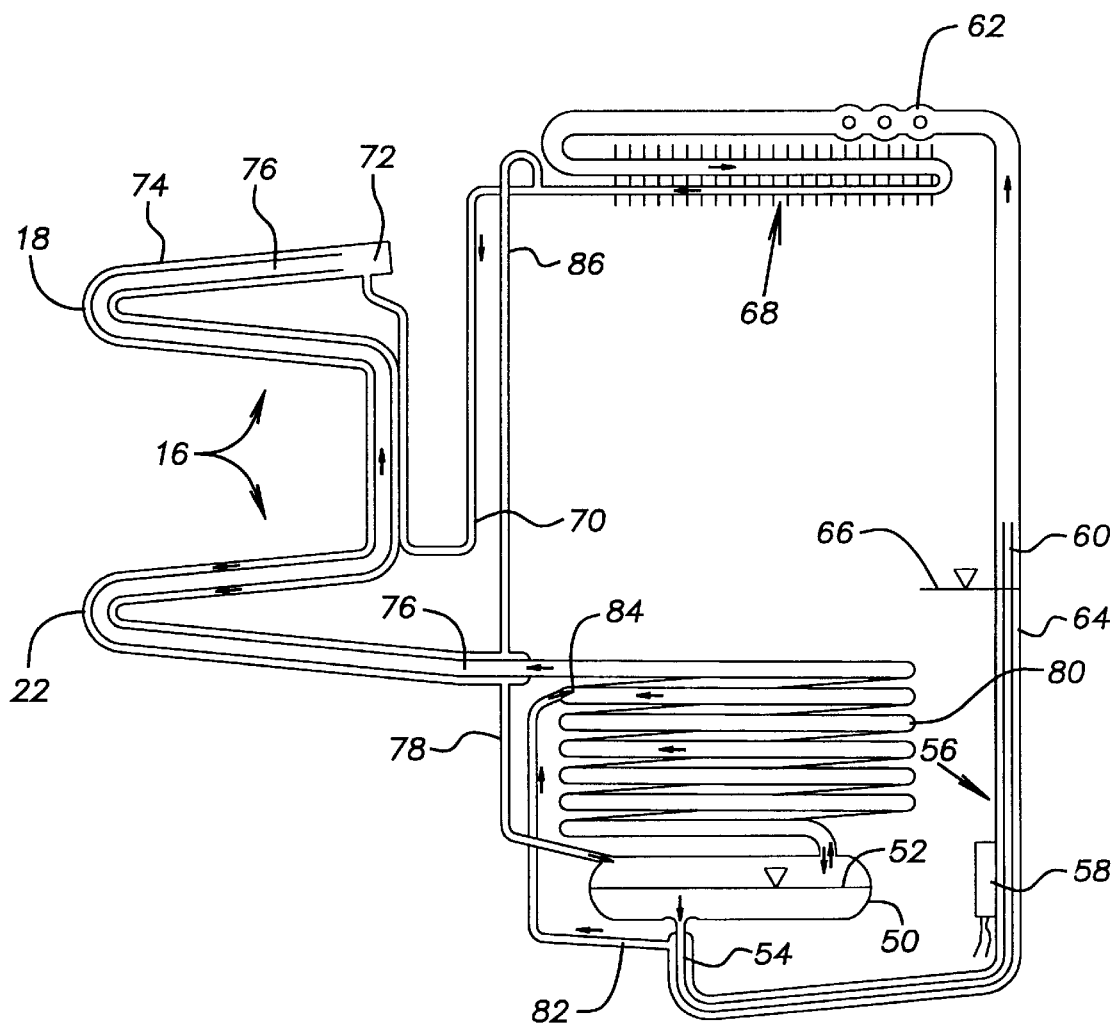
FIG. 2 shows a schematic view of an absorption refrigerating apparatus for cooling the cabinet.

Referring to FIGS. 1 and 2, a refrigerator cabinet 10 includes a freezing compartment 12 for storing frozen goods and a refrigerating compartment 14 for storing chilled goods. The compartments 12, 14 are refrigerated by an evaporator 16 of an absorption refrigerating apparatus (FIG. 2) and maintained, for example, at −18° C. and +3° C., respectively. The evaporator 16 has an upper part 18, which is in heat conductive contact with a heat transfer plate 20 forming a part of a wall of the freezing compartment 12. The evaporator also has a lower part 22, which is in heat conductive contact with a plate 24 forming a part of a wall of the refrigerating compartment 14. A heat insulating plate 26 is arranged in front of the freezer plate 20 so that a vertical duct 28 is formed between the plates 20 and 26. A fan 30 operated by an electric motor 32 causes air circulation 34 through the duct 28 in the compartment 12 as shown by the arrows. The circulating air is thereby cooled by the plate 20. Preferably, the fan 30 is variable speed in proportion to the voltage supplied to the fan. The fan can be connected to a door switch so that the fan does not operate when the freezer door is open. A film heater 36 is provided on the face of plate 20 defining the vertical duct 28. Preferably, the film heater is a positive temperature coefficient electrical resistance heater. A frost sensor 38 is located on the plate 20, preferably near the top, which is the coldest part of plate 20 and where the frost melts last during defrosting. The frost sensor is a temperature sensor for sensing the temperature of the plate 20 and the film heater 36. The frost sensor determines that frost is absent from the plate and the heater when the temperature is above 0° C.

Referring to FIG. 2, the absorption refrigerating apparatus, which can be a conventional type, includes an absorber vessel 50 that contains an absorption liquid, such as water, in which a refrigerant, such as ammonia, is dissolved. This solution, which is relatively rich in refrigerant, is called a rich solution and is nominally at a level 52. The rich solution exits from the absorber 50 through a conduit 54 in the bottom of the absorber vessel and enters a boiler 56. An electric heating cartridge 58 heats the rich solution in the boiler. Refrigerant vapor boils off from the rich solution, which thereby becomes a so-called "weak" solution. The mixture of refrigerant vapor and weak solution is expelled through a pump pipe 60, the refrigerant vapor continuing to a separator 62, which separates out absorption liquid accompanying the refrigerant vapor. The weak solution is collected in an outer pipe 64 of the boiler 56 up to a certain level 66. The refrigerant vapor flows from the separator 62 to a condenser 68 where heat is transferred from the vapor to surrounding air so that the vapor condenses. The refrigerant condensate leaves the condenser 68 through a conduit 70 and enters the upper part 18 of the evaporator 16 at an inlet 72.

The evaporator 16 includes an outer pipe 74 in which an inner pipe 76 is arranged. An inert gas, such as hydrogen, is supplied to the inlet 72 through the inner pipe 76 and meets there the flow of condensate, which is vaporized in the inert gas during absorption of heat. During vaporization of the refrigerant in the inert gas, the mixture of refrigerant and inert gas flows in the gap between the outer pipe 74 and inner pipe 76, from the inlet 72 first through the upper part 18 of the evaporator 16 and then through the lower part 22 of the evaporator. The mixture of refrigerant and inert gas leaves the lower part 22 of the evaporator through a pipe 78 that leads to the absorber vessel 50. The mixture of refrigerant vapor and inert gas rises from the absorber vessel 50 through an absorber 80 and meets the weak solution, which, driven by the level 66, comes from the pipe 64 via a conduit 82 into the upper part of the absorber at an inlet 84. When the weak solution flows downwards through the absorber 80, the weak solution absorbs refrigerant vapor flowing upwards while expelling heat to the surrounding air. The weak solution thereby becoming a rich solution again before it flows down and is collected in the absorber vessel 50 below the level 52. The rising inert gas continues from the absorber 80 to the pipe 76 and flows through the evaporator 16 to the inlet 72. In order to prevent inert gas, which accompanies the refrigerant to the condenser, from collecting in the condenser and disturbing the outflow of refrigerant condensate from the condenser, a vent conduit 86 is arranged between the outlet of the condenser 68 and the conduit 78 for carrying the inert gas to the absorber vessel 50.

Referring to FIG. 1, a first controller 90 is connected to a temperature sensor 92, which senses the temperature in the refrigerating compartment 14. A second controller 94 is connected to a temperature sensor 96, which senses the temperature in the freezing compartment 12. The second controller 94 is also connected to control the fan motor 32. A cable 98 is connected to the second controller 94 to provide an electric current to the film heater 36. An upper pipe 100 carries melted frost or condensate from the freezing compartment 12 to the refrigerating compartment 14. A lower pipe 102 carries the melted frost or condensate from the refrigerating compartment 14 to a drain (not shown). The frost sensor 38 is connected to the second controller 94 to indicate whether frost is present on the plate 20.

The temperature of the refrigerating compartment 14 is controlled in the following way. Using the first controller 90, a temperature t1 that is desired in the refrigerating compartment 14 is set, for example +3° C. When the temperature in the compartment 14 has risen to t1+1° C., the controller 90 activates the heating cartridge 58, through which the refrigerating apparatus of FIG. 2 is brought into operation. When the temperature in the compartment 14 falls to t1−1° C. the controller 90 shuts off the heating cartridge 58 and, thus, the refrigerating apparatus.

The temperature of the freezing compartment 12 is controlled in the following way. Using the second controller 94, a temperature t2 that is desired in the compartment 12 is set, for example −18° C. When the temperature in the compartment 12 has risen to t2+1° C. the second controller 94 activates the fan 30, which thereby moves the air in the compartment 12 across the plate 20, the air being cooled by the plate. When the temperature in the freezing compartment 12 falls to t2−1° C., the controller 94 shuts off the fan 30. Preferably, the fan 30 is operated by the second controller 94 so that the rotation speed of the fan is increased when the demand for refrigeration in the freezing compartment 12 increases, and the rotation speed of the fan is decreased when the demand for refrigeration in the freezing compartment 12 decreases. This is accomplished by determining the difference between the measured temperature in the freezing compartment and the set temperature. The difference is converted to a voltage that controls the fan speed. Thus, the air flow across the plate is increased as the temperature in the freezing compartment rises.

By increasing the air circulation in the freezing compartment, the heat transfer between the air and the upper part of the evaporator will increase causing more refrigerant to be vaporized in the upper part 18. The lower part 22 of the evaporator will, accordingly, have a decreased amount of refrigerant to vaporize for the cooling of the refrigerating compartment. Thus, the cooling capacity of the refrigerating compartment will decrease. This decrease of the cooling capacity of the refrigerating compartment will, however, be compensated because the temperature sensor 92 in the refrigerating compartment will effect longer operating periods of the refrigerating apparatus.

The freezing compartment 12 can also be used for storing goods, which require a temperature that is higher than the temperature obtainable only by controlling the fan, for example 0° C. This higher temperature can be reached in the freezing compartment 12 if the second controller 94 simultaneously controls the fan 30 and the heat release of the film heater 36 by controlling an electric current to the film heater 36 through the cable 98. If the freezer temperature is below the target temperature, the film heater is activated. Thus, the freezing compartment 12 can function at the chilling temperature of the refrigerating compartment if so desired, i.e. where in effect two chilling compartments without a freezing compartment is desired.

Frost that is detected by the frost sensor 38 on the film heater 36 is defrosted by the fan 30 being shut off and the film heater 36 being heated. When the frost sensor 38 determines that the frost is gone, the heater is deactivated and, after a delay of about 10 minutes, the fan is started. A timer for controlling defrosting can be provided, in the controller, for example. During an automatic defrost mode, which occurs overnight or every 12 hours, for example, the timer shuts off the absorption unit and the fan, and also activates the film heater. When the frost sensor determines that the frost is gone, the heater is shut off and the absorption unit is switched on. When the film temperature is lower than the freezing compartment temperature, the fan is switched on. The melted frost is conducted down to the refrigerating compartment 14 through the upper pipe 100. From the compartment 14 the water is conducted away through the pipe 102 together with frost which has been melted away from the plate 24 in the refrigerating compartment 14.

Figure 3:
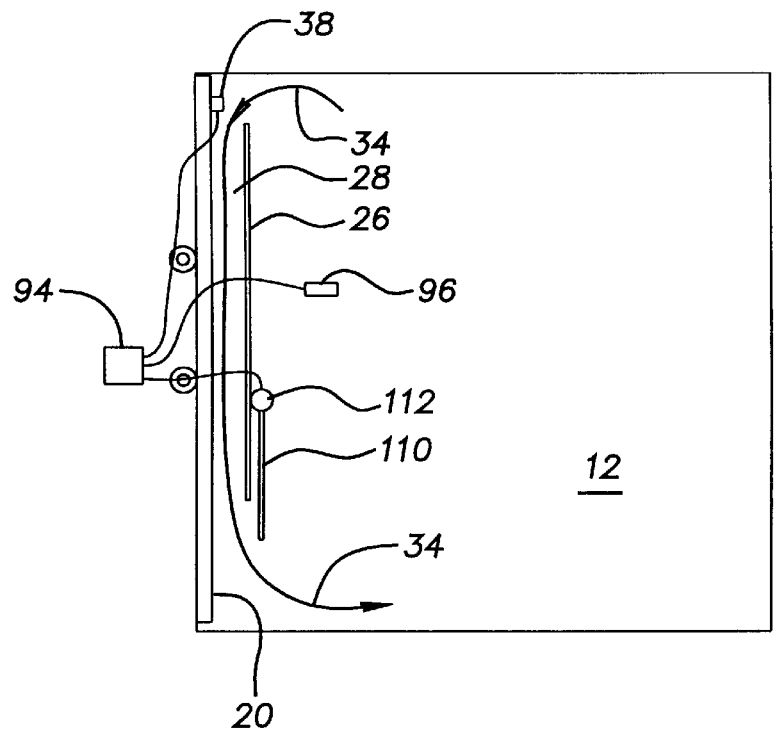
FIG. 3 shows a schematic view of a freezer compartment having a damper.

Heat transfer from the freezing compartment 12 to the freezer plate 20 can be controlled by any of several other temperature adjustment devices. Referring to FIG. 3, the insulating plate 26 in the freezing compartment 12 is provided with a movable damper 110. The damper 110 is slidable or swingable and operated by a damper motor 112 connected to the second controller 94. The damper 110 is preferably provided at a lower part of the insulating plate to selectively open and close an opening permitting air flow 34 through the vertical duct 28. Using the second controller 94, a temperature t2 that is desired in the compartment 12 is set, for example −18° C. When the temperature in the compartment 12 has risen to t2+1° C. the second controller 94 controls the motor 112 to open the damper 110, which thereby permits the air in the compartment 12 to move across the plate 20, the air being cooled by the plate. When the temperature in the freezing compartment 12 falls to t2−1° C., the controller 94 closes the damper 110. Preferably, the controller 94 positions the damper at any of an infinite number of positions, continuously or periodically, depending on the cooling requirements of the freezing compartment to vary the air flow, and therefor the heat transfer. For example, the damper moves from a partly closed position to a more open position as cooling requirements increase.

Figure 4:
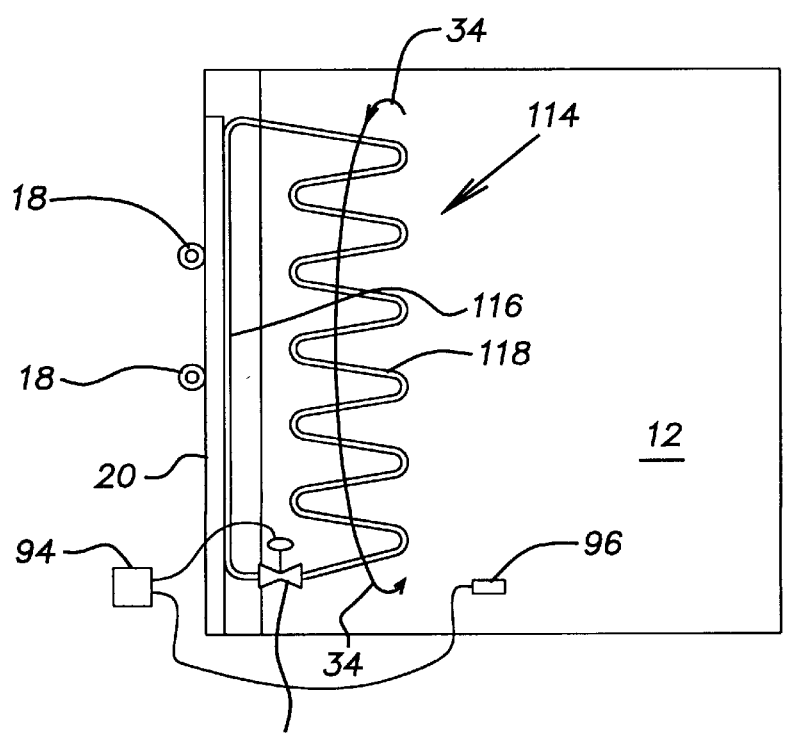
FIG. 4 shows a schematic view of a freezer compartment having a heat pipe.

Referring to FIG. 4, a heat pipe 114 is provided with its condenser tube 116 mounted in thermal contact with the upper part 18 of the evaporator, preferably at the plate 20. The evaporator tube 118 of the heat pipe is located in the freezing compartment 12. The heat pipe is provided with a valve 120 operated by the controller 94. The heat pipe can be two phase (liquid-vapor) or single phase (liquid-liquid or vapor-vapor). In the case of a single phase heat pipe, the terms "evaporator tube" and "condenser tube" are not literal, but are equated to heat source and heat sink, respectively. Air flow 34 in the freezing compartment 12 passes over the evaporator tube 118 by convection. Using the second controller 94, a temperature t2 that is desired in the compartment 12 is set, for example −18° C. When the temperature in the compartment 12 has risen to t2+1° C. the second controller 94 opens the valve 120, which thereby permits refrigerant in the heat pipe 114 to flow. The air in the compartment 12 moves across the evaporator tube 120 and is cooled by the tube. When the temperature in the freezing compartment 12 falls to t2−1° C., the controller 94 closes the valve 120. Preferably, the controller 94 positions the valve at any of an infinite number of positions, continuously or periodically, depending on the cooling requirements of the freezing compartment to very the heat transfer. For example, the valve moves from a partly closed position to a more open position as cooling requirements increase. Defrosting of the heat pipe 114 is accomplished similar to defrosting of the plate 20.

Figure 5:
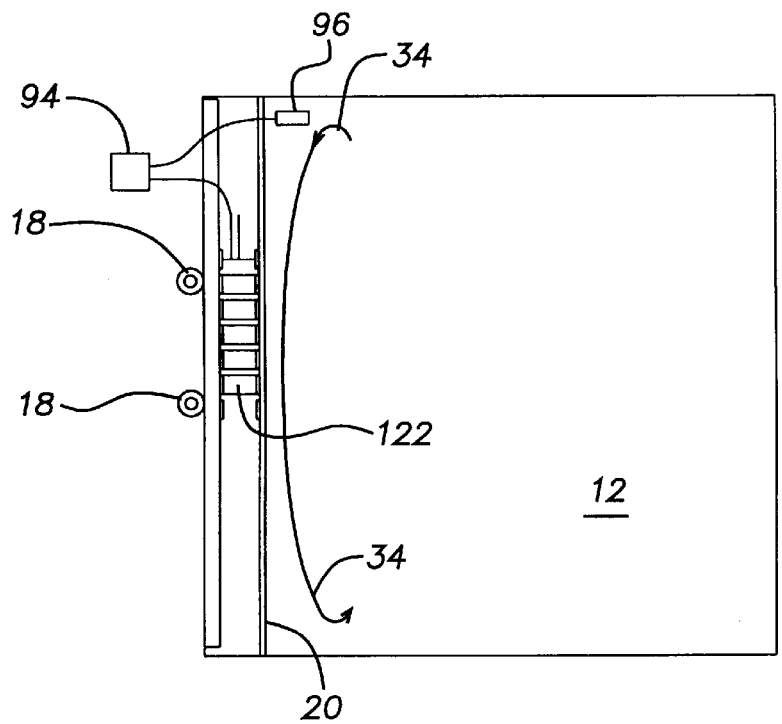
FIG. 5 shows a schematic view of a freezer compartment having a Peltier element.

Referring to FIG. 5, a Peltier element 122 is mounted so that one face is in thermal contact with the upper part 18 of the evaporator. The other face of the Peltier element 122 is in thermal contact with the plate 20 located in the freezing compartment 12. The Peltier element 122 is operated by the controller 94. Air flow 34 in the freezing compartment 12 passes over the plate 20 by convection. Using the second controller 94, a temperature t2 that is desired in the compartment 12 is set, for example −18° C. When the temperature in the compartment 12 has risen to t2+1° C. the second controller 94 activates the Peltier element, which transfers heat from the plate 20 to the upper part 18 of the evaporator. The air in the compartment 12 moves across the plate 20 and is cooled by the plate. When the temperature in the freezing compartment 12 falls to t2−1° C., the controller 94 deactivates the plate 20. Preferably, the controller 94 operates the Peltier element 122 at any of an infinite number of settings, continuously or periodically, depending on the cooling requirements of the freezing compartment to vary the heat transfer. For example, the heat transfer is increased as cooling requirements increase or reversing the polarity if cooling requirements suddenly decrease.

Figure 6:
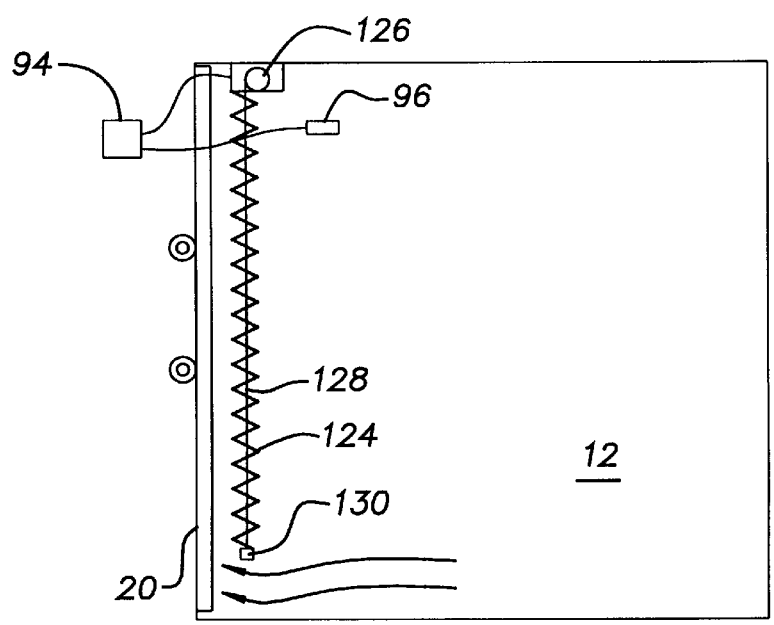
FIG. 6 shows a schematic view of a freezer compartment having a venetian blind.

Referring to FIG. 6, a thermally insulating, movable wall, such as a retractable blind 124, is mounted between the plate 20 and the freezing compartment 12. Preferably, the blind 124 is suspended from the top of the compartment 12 and operated by a motor 126 connected to strings 128. A weight 130 pulls the blind toward the extended position. The motor is controlled by the second controller 94 to raise and lower the blind 124. Using the second controller 94, a temperature t2 that is desired in the compartment 12 is set, for example −18° C. When the temperature in the compartment 12 has risen to t2+1° C. the second controller 94 controls the motor 126 to raise (open) the blind 124, which thereby permits the air in the compartment 12 to move across the plate 20, the air being cooled by the plate. When the temperature in the freezing compartment 12 falls to t2−1° C., the controller 94 lowers (closes) the blind 124. Preferably, the controller 94 positions the blind at any of an infinite number of positions, continuously or periodically, depending on the cooling requirements of the freezing compartment to vary the heat transfer. For example, the blind is moved from a partly closed position to a more open position as cooling requirements increase.

The present disclosure describes several embodiments of the invention, however, the invention is not limited to these embodiments. Other variations are contemplated to be within the spirit and scope of the invention and appended claims. Elements of the different aspects of the invention can be combined and interconnected. For example, the fan can be located adjacent the heat pipe to vary air flow over the pipe.

What is claimed is:

1. A refrigerated cabinet comprising:
   an absorption refrigeration apparatus having an evaporator;
   a freezing compartment cooled by a first part of the evaporator;
   a refrigerating compartment cooled by a second part of the evaporator;
   a temperature adjustment device for adjusting the temperature in the freezing compartment separately from the refrigerating compartment;
   a first controller including a first temperature sensor that senses temperature in the refrigerating compartment and adapted to control the refrigeration apparatus responsive to the temperature sensed in the refrigerating compartment; and
   a second controller including a second temperature sensor that senses temperature in the freezing compartment, wherein said second controller is adapted to control the temperature adjustment device responsive to the temperature sensed in the freezing compartment and wherein said temperature adjusting device is operable independent of the sensed temperature in the temperature in the refrigerating compartment.

2. A refrigerated cabinet according to claim 1, wherein the temperature adjustment device comprises means for controlling air flow in the freezing compartment past a means for transferring heat to the evaporator.

3. A refrigerated cabinet comprising:
   an absorption refrigeration apparatus having an evaporator;
   a freezing compartment cooled by a first part of the evaporator;
   a refrigerating compartment cooled by a second part of the evaporator;
   a temperature adjustment device for adjusting the temperature in the freezing compartment separately from the refrigerating compartment;
   a first controller that senses temperature in the refrigerating compartment;
   a second controller that senses temperature in the freezing compartment and controls the temperature adjustment device responsive to the temperature sensed in the freezing compartment; and
   a heater disposed in the freezing compartment and connected to be operated by the second controller.

4. A refrigerated cabinet according to claim 3, wherein the second controller operates the heater responsive to the temperature sensed in the freezing compartment.

5. A refrigerated cabinet according to claim 4, wherein the heater is disposed and operated for defrosting a heat transfer element of the freezing compartment.

6. A refrigerated cabinet according to claim 1, wherein the temperature adjustment device is a fan and the second controller controls the fan responsive to the temperature sensed in the freezing compartment.

7. A refrigerated cabinet according to claim 6, wherein the second controller controls the speed of the fan responsive to the temperature sensed in the freezing compartment.

8. A cabinet according to claim 7, wherein the fan speed is infinitely variable and the second controller continuously varies the fan speed responsive to the sensed temperature.

9. A refrigerated cabinet comprising:
   an absorption refrigeration apparatus having an evaporator;
   a freezing compartment cooled by a first part of the evaporator;
   a refrigerating compartment cooled by a second part of the evaporator;
   a temperature adjustment device for adjusting the temperature in the freezing compartment separately from the refrigerating compartment, wherein the temperature adjustment device is a fan;
   a first controller that senses temperature in the refrigerating compartment;
   a second controller that senses temperature in the freezing compartment and controls the temperature adjustment device responsive to the temperature sensed in the freezing compartment, wherein the second controller controls the fan responsive to the temperature sensed in the freezing compartment;
   a heat transfer plate for conducting heat from the freezing compartment to the first part of the evaporator; and
   a wall located in the freezing compartment and spaced from the transfer plate to define a duct for air flow, wherein the fan is disposed for blowing air through the duct.

10. A refrigerated cabinet comprising:

an absorption refrigeration apparatus having an evaporator;

a freezing compartment cooled by a first part of the evaporator;

a refrigerating compartment cooled by a second part of the evaporator;

a temperature adjustment device for adjusting the temperature in the freezing compartment separately from the refrigerating compartment;

a first controller that senses temperature in the refrigerating compartment; and a second controller that senses temperature in the freezing compartment and controls the temperature adjustment device responsive to the temperature sensed in the freezing compartment;

a heat transfer plate for conducting heat from the freezing compartment to the first part of the evaporators; and a wall located in the freezing compartment and spaced from the transfer plate to define a duct for air flow, wherein the temperature adjustment device comprises a damper that is movable to control air flow through the duct and the second controller controls the position of the damper.

11. A refrigerated cabinet according to claim 10, further comprising a motor for moving the damper, wherein the damper is a slidable door.

12. A refrigerated cabinet according to claim 1, wherein the temperature adjustment device comprises a heat pipe having a valve for controlling flow of refrigerant in the heat pipe, wherein the heat pipe conducts heat from the freezing compartment to the first part of the evaporator and the second controller controls the position of the valve.

13. A refrigerator cabinet according to claim 12, wherein the heat pipe contains refrigerant in liquid and vapor phases and comprises a condenser tube located at the first part of the evaporator and an evaporator tube located in the freezing compartment.

14. A refrigerator cabinet according to claim 1, wherein the temperature adjustment device comprises a Peltier element having a first face at the first part of the evaporator and a second face in communication with the freezing compartment, and the second controller is connected to control power supplied to the Peltier element.

15. A refrigerator cabinet according to claim 14, further comprising a heat transfer plate for conducting heat from the freezing compartment to the second face of the Peltier element.

16. A refrigerator cabinet according to claim 1, wherein the temperature adjustment device comprises a movable wall disposed between the first part of the evaporator and the freezing compartment, wherein the second controller is connected to control movement of the wall.

17. A refrigerator cabinet comprising:

an absorption refrigeration apparatus having an evaporator;

a freezing compartment cooled by a first part of the evaporator;

a refrigerating compartment cooled by a second part of the evaporator;

a temperature adjustment device for adjusting the temperature in the freezing compartment separately from the refrigerating compartment, wherein the temperature adjustment device comprises a movable wall disposed between the first part of the evaporator and the freezing compartment;

a first controller that senses temperature in the refrigerating compartment; and a second controller that senses temperature in the freezing compartment and controls the temperature adjustment device responsive to the temperature sensed in the freezing compartment, wherein the second controller is connected to control movement of the wall; and a heat transfer plate for conducting heat from the freezing compartment to the first part of the evaporator, wherein the movable wall is disposed in the freezing compartment adjacent the heat transfer plate and movement of the wall exposes the heat transfer plate to the freezing compartment.

18. A refrigerator cabinet comprising:

an absorption refrigeration apparatus having an evaporator;

a freezing compartment cooled by a first part of the evaporator;

a refrigerating compartment cooled by a second part of the evaporator;

a temperature adjustment device for adjusting the temperature in the freezing compartment separately from the refrigerating compartment, wherein the temperature adjustment device comprises a movable wall disposed between the first part of the evaporator and the freezing compartment and the movable wall comprises a suspended collapsible blind operated by a motor;

a first controller that senses temperature in the refrigerating compartment; and a second controller that senses temperature in the freezing compartment and controls the temperature adjustment device responsive to the temperature sensed in the freezing compartment, wherein the second controller is connected to control movement of the wall.

19. A refrigerated cabinet comprising:

an absorption refrigeration apparatus having an evaporator;

a refrigerating compartment cooled by a lower part of the evaporator;

a freezing compartment;

a heat transfer plate for conducting heat from the freezing compartment to an upper part of the evaporator for cooling the freezing compartment;

a film heater on the transfer plate;

a first controller that senses temperature in the refrigerating compartment; and a second controller that senses temperature in the freezing compartment and is connected to control power to the film heater.

20. A refrigerated cabinet according to claim 19, further comprising a sensor for sensing frost on the transfer plate wherein the second controller is connected to operate the heater responsive to the sensing of frost on the transfer plate.

21. A refrigerated cabinet according to claim 20, wherein the frost sensor is a temperature sensor disposed on the transfer plate.

22. A refrigerated cabinet according to claim 19, wherein the second controller is connected to operate the heater responsive to the temperature sensed in the freezing compartment.

23. A refrigerated cabinet according to claim 22, wherein the second controller is connected to operate the heater for controlling the temperature in the freezing compartment and for defrosting the heat transfer plate.

24. A refrigerated cabinet according to claim 19, further comprising a wall located in the freezing compartment and spaced from the transfer plate to define a duct for air flow.

25. A method of operating a refrigerated cabinet comprising an absorption refrigeration apparatus having an evaporator; a freezing compartment cooled by a first part of the evaporator; a refrigerating compartment cooled by a second part of the evaporator; a temperature adjustment device; a first controller including a first temperature sensor that senses temperature in the refrigerating compartment; and a second controller including a second temperature sensor that senses temperature in the freezing compartment and controls the temperature adjustment device, the method comprising the steps of:

transferring heat from the freezing compartment to the first part of the evaporator;

transferring heat from the refrigerating compartment to the second part of the evaporator;

sensing temperature in the refrigerating compartment using the first temperature sensor;

controlling operation of the refrigeration apparatus responsive to the temperature sensed in the refrigerating compartment;

sensing temperature in the freezing compartment using the second temperature sensor; and controlling operation of the temperature adjustment device responsive to the temperature sensed in the freezing compartment by the second temperature sensor and independent of the temperature sensed in the refrigerating compartment by the first temperature sensor to adjust the heat transfer from the freezing compartment to the first part of the evaporator to thereby control the temperature in the freezing compartment separately from the temperature in the refrigerating compartment.

26. A refrigerated cabinet according to claim 1, wherein the temperature adjustment device is operable independent of operation of the refrigerating device.

* * * * *